Patented Sept. 25, 1951

2,569,182

UNITED STATES PATENT OFFICE 2,569,182

PRODUCTION OF ARECOLINE

Joseph Levy, Union, N. J., assignor to Nopco Chemical Company, Harrison, N. J., a corporation of New Jersey No Drawing. Application September 23, 1949, Serial No. 117,513

9 Claims. (Cl. 260—295.5)

1

This invention relates to arecoline and to an improved process for preparing it.

Arecoline is the methyl ester of arecaidine, i. e. it is the methyl ester of N-methyl-$\Delta^{3,4}$-tetrahydropyridine-3-carboxylic acid. Arecoline has important pharmaceutical uses, the most important of which is its use by veterinarians as an anthelmintic for which purpose it is usually employed in the form of its hydrobromide salt. In the past this compound has been obtained almost entirely from betel nuts inasmuch as no practical commercial methods for producing it synthetically have been available. Numerous proposals for synthetically producing this compound have been made but in practically all cases such methods have been quite complicated, involving long and drawn out procedures and resulting in very poor yields of the compound.

In the co-pending U. S. patent application of Lawrence H. Knox, Serial No. 724,243, filed January 24, 1947, now U. S. Patent No. 2,506,458 patented May 2, 1950, a new and very highly improved process for the production of arecoline is disclosed and claimed. In one of the steps of this novel process, the methyl ester of N-methyl-4-hydroxypiperidine-3-carboxylic acid is dehydrated by removal of the hydroxy group from the 4 position and the hydrogen atom from the 3 position to form a double bond between the 3 carbon atom and the 4 carbon atom, thus giving arecoline. This dehydration step of the process of Patent No. 2,506,458 is carried out by admixing the hydrochloride salt of the 4-hydroxypiperidine compound with either thionyl chloride or phosphorus oxychloride. The outstanding aspect of said invention is that the dehydration of the hydroxypiperidine compound is accomplished without hydrolysis of the ester group on the 3 position. In the prior art when dehydration of such 4-hydroxypiperidine compounds was accomplished with mixtures of acetic acid and hydrochloric acid or hydrochloric acid and potassium iodide the ester group was simultaneously hydrolyzed to the free acid. Furthermore, the previous methods for dehydrating the hydroxypiperidine compounds required periods of time of from 20 to 25 hours to accomplish the dehydration step. The process of Patent No. 2,506,458, on the other hand, requires only a relatively short time for the dehydration inasmuch as the hydroxypiperidine compound is merely admixed with either thionyl chloride or phosphorus oxychloride by the dropwise addition of the dehydrating agent to the hydroxypiperidine. The dehydration is completed in a short time after all of the required amount of dehydrating agent has been added to the hydroxypiperidine. Another disadvantage of the prior art methods employed previous to the discovery of the aforesaid dehydration process was that the prior art methods necessitated a subsequent esterification of the free acid, i. e. arecaidine, with methyl alcohol in order to produce the desired arecoline. This esterification step required a period of approximately 16 hours to accomplish. Thus these previous methods required a total reaction time of from about 35 to 40 hours to produce the desired arecoline from the methyl ester of N-methyl-4-hydroxypiperidine-3-carboxylic acid. The process of Patent No. 2,506,458 is a marked improvement over the prior art methods inasmuch as it accomplishes in a single step and in a very short time a result for which the prior art processes require two steps and from 35 to 40 hours. Although the dehydration process of Patent No. 2,506,458 is an outstanding improvement over the prior art methods, there are a few features regarding this process which could be substantially improved. In addition to producing the desired compound having the double bond between the 3 carbon atom and the 4 carbon atom, i. e. arecoline, this dehydration process also results in the production of a substantial amount of an undesired isomer having the double bond between the 4 carbon atom and the 5 carbon atom. The two isomers can be separated from each other with a fair degree of success by crystallization of their hydrobromide salts; however, it is somewhat difficult even by this means to produce arecoline hydrobromide having a melting point greater than 170° C. The National Formulary specifications state that arecoline hydrobromide should have a melting point between 170° C. and 175° C. It is seen, therefore, that the purity of the arecoline produced by the dehydration process of Patent No. 2,506,458 is not as high as desired. Furthermore, that dehydration process results in a yield of arecoline in most cases of only about 45% based on the amount of 4-hydroxypiperidine compound treated. A further disadvantage of the process of Patent No. 2,506,458 is that it is rather difficult to isolate all of the arecoline from the dehydration reaction mixture as the free base without effecting saponification of the ester group and thus causing the loss of a substantial percentage of the arecoline. After that dehydration step is completed, alkali is added to the reaction mixture to convert the hydrochloride salt of the arecoline formed in the process to the free base. Thereafter the free arecoline is extracted from the reaction mixture with a solvent such as chloroform or toluene. It has been found, however, that while a strong alkali is required to completely liberate the arecoline base from its hydrochloride salt, the use of such strong alkali causes a substantial percentage of the ester groups at the 3 position to be saponified during the isolation process thus reducing the yield of the arecoline. Another disadvantage of this process is the formation of $SO_2$ and HCl fumes both of which are noxious and are quite corrosive and require special equipment for removal.

It is the object of this invention to provide an improved process for the dehydration of the esters of N-methyl-4-hydroxypiperidine-3-carboxylic acid.

A further object of the invention is to provide an improved process for the production of arecoline.

Another object of this invention is to provide a dehydration process which will produce primarily the $\Delta^{3,4}$ isomer of 1-methyl-3-carbomethoxy-tetrahydropyridine.

Other objects of the invention will in part be obvious and will in part appear hereinafter.

I have discovered that the dehydration of esters of N-methyl-4-hydroxypiperidine-3-carboxylic acid may be very efficiently carried out in a very short time by heating such esters with anhydrous oxalic acid. The dehydration is accomplished in a very short time with little or no hydrolysis of the ester group at the 3 position. Furthermore, the product which is obtained contains a very high percentage, i. e. 90% or better, of the desired arecoline and only a very small percentage, if any, of the undesired ester having the double bond in the 4,5 position. Since this is the case, arecoline hydrobromide of a very high state of purity may be readily isolated from the product by crystallization of the hydrobromide salts. Furthermore, the total yield of arecoline which is obtained by this process is usually at least about 25% to 50% greater than the yield which can be obtained by the process of Patent No. 2,506,458. Moreover, the free base is readily liberated from the oxalate salt thereof with a weak alkali without any appreciable saponification of the ester groups. Preferably the free base is reacted with the oxalic acid although if desired the acetate or hydrochloride salts of the base may be reacted with the oxalic acid.

In carrying out the dehydration of the 4-hydroxypiperidine compound with the anhydrous oxalic acid, the piperidine compound and the oxalic acid may be heated together either in the presence of or in the absence of a suitable entraining agent. In most cases it is preferred that the dehydration be carried out in the presence of an entraining agent which will aid in rapidly removing the water from the reaction mixture as soon as the water is formed inasmuch as the presence of water in the reaction mixture at the elevated temperatures employed in the process has a tendency to effect the hydrolysis of the ester group on the 3 position. However, very excellent yields of arecoline may be obtained merely by fusing the oxalic acid and the piperidine compound with each other and heating them together for a short time at an elevated temperature.

The temperature at which the oxalic acid and the hydroxypiperidine compound are heated must in order to remove the water be above 100° C., of course, if the heating is carried out at atmospheric pressure in the absence of an entraining agent. In most cases it is preferred not to go above about 160° C. inasmuch as temperatures in excess of 160° C. often have a tendency to cause decomposition of the hydroxypiperidine compound and of the arecoline. In carrying out such heating, the heating may be conducted at atmospheric pressure and in most cases it is preferred to heat the reaction mixture at such pressure. If desired, however, the dehydration step may be carried out under a vacuum in which case somewhat lower temperatures can be employed; however, even when a vacuum is employed during the dehydration step it is greatly preferred to heat the reaction mixture to a temperature between about 100° C. and about 160° C. with temperatures of from about 130° to about 150° C. being the preferred range both when the heating is carried out at atmospheric pressure and when it is carried out under vacuum and also both when an entraining agent is employed and when an entraining agent is not employed.

In the event that an entraining agent is employed in the dehydration step, hydrocarbons such as naphtha, octane, nonane, decane, xylene, toluene, ethyl benzene, cumene, propyl benzene, methyl cyclohexane, etc., are employed. The naphtha which is employed should have a boiling point between about 100° C. and about 160° C. These compounds are all hydrocarbon solvents and any hydrocarbon solvent, either aromatic or aliphatic, which has a boiling point between about 100° C. and about 160° C. is quite suitable for use as an entraining agent in the process of my invention. When a solvent is employed, the dehydration reaction is ordinarily carried out under reflux conditions. Preferably I employ xylene and carry out the dehydration step by heating the mixture of xylene, oxalic acid and the hydroxypiperidine at the reflux temperature of the xylene.

When a solvent is employed as an entraining agent in the dehydration process, the amount of the solvent may vary considerably. The solvent does not actually enter into the dehydration reaction but it does aid in the very rapid removal from the reaction mixture of the water as soon as it is formed. I have found that this is an important factor since the presence of water in the hot reaction mixture apparently tends to cause a small percentage of the ester groups at the 3 position to be hydrolyzed. This is evident from the fact that higher yields of arecoline are obtained when such an entraining agent is employed during the dehydration reaction than when one is not employed. Ordinarily sufficient solvent is employed to give a readily stirrable mixture of the solvent, oxalic acid and hydroxypiperidine; however, since even a very small amount of the solvent will to some extent aid in the rapid removal of the water, one can if desired use only very small amounts of solvent as an entraining agent. Likewise there is no particular upper limit on the amount of solvent employed other than convenience and economy of operation.

The length of time of heating the reaction mixture will vary somewhat depending upon the temperature at which the reaction mixture is heated with slightly longer times of heating being required at the lower temperatures and shorter times of heating being utilized at the higher temperatures. The presence or absence of an entraining agent in most cases does not seem to make any particular difference as to the length of time which the reaction mixture must be heated; but the presence of such an agent does appear to increase the yield of the desired product possibly by aiding in the more or less instantaneous elimination of water from the reaction mixture as soon as it is formed and thus preventing any appreciable amount of hydrolysis of the ester groups at the 3 position from occurring. When the reaction mixture is heated at a temperature of from about 130° C. to about 150° C., reaction times of from about 3 to about 4 hours are quite suitably employed. When xylene is employed as an entraining agent, the reaction mixture is heated at the reflux temperature of the xylene; and under such conditions I have found that a reaction time of 3½ hours gives very excellent results. However, as I have just pointed out, the reaction time will vary depending upon the particular reaction temperature which is utilized.

The amount of oxalic acid which is employed in my novel process should be sufficient, of course, to completely dehydrate the hydroxypiperidine compound. An amount of oxalic acid slightly in excess of that required to convert the hydroxypiperidine compound to the oxalate salt thereof, i. e. slightly more than ½ mole of the oxalic acid per mole of the hydroxypiperidine compound, will accomplish this result; but in order to obtain the most efficient results, I greatly prefer to employ about 2 moles of oxalic acid per mole of hydroxypiperidine and, if desired, larger ratios of oxalic acid to the hydroxypiperidine compound may be employed. In order to effect the desired dehydration it is necessary that the oxalic acid which is reacted with the hydroxypiperidine compound be anhydrous oxalic acid. Of course, if desired, one can admix hydrated oxalic acid with the hydroxypiperidine compound and then heat the mixture until the water of hydration is driven from the oxalic acid and thereafter carry out the dehydration. I prefer, however, to remove any water of hydration from the oxalic acid prior to admixing it with the hydroxypiperidine compound.

Following the completion of the dehydration step, the desired arecoline is readily recovered from the reaction mixture in any convenient manner. I prefer to cool the reaction mixture to about 100° C. and then add thereto approximately one to two parts of water for each part of the original mixture of oxalic acid and hydroxypiperidine compound after which the entraining agent, which forms a solvent layer, is separated from the aqueous mixture. The solvent layer is then washed with small portions of water, which washes are added to the aqueous solution of the arecoline. The combined aqueous extracts are then neutralized with some weak base such as potassium or sodium carbonate in order to convert the oxalic acid salt of the arecoline to the free base. If the dehydration reaction is carried out in the absence of an entraining agent, the reaction mixture is dissolved in water on completion of the dehydration reaction using the same amount of water as when such an agent had been employed in the process, and then the oxalic acid salt of the arecoline is converted to the free base in the same manner as in the aqueous mixtures obtained from the reactions carried out in the presence of an entraining agent. The free base is recovered from the aqueous mixtures by extraction with a water-immiscible solvent such as ether, benzene, toluene, isopropyl acetate, etc., and the arecoline is recovered from the solvent merely by distilling the solvent from the solvent solution.

The product which is isolated from the dehydration reaction mixture is a mixture of arecoline, the isomer thereof having the double bond between the 4 carbon atom and the 5 carbon atom and unknown by-products, with about 90% or more of the product being the desired arecoline. The arecoline is readily isolated in very pure form by treating the crude product with ethanol containing an equivalent weight of anhydrous hydrobromic acid. Arecoline hydrobromide forms very readily in such a mixture and separates therefrom as colorless needles on cooling with the hydrobromide of the undesired isomer remaining in solution. In practically every case it will be found that the arecoline hydrobromide produced in this manner will have a melting point of from 172°–174° C. This is from 2° to 4° C. higher than the melting point of the product ordinarily isolated from natural sources or the melting point of the product obtained by the process of Patent No. 2,506,458. Furthermore, the arecoline hydrobromide produced by the process of my invention may be recrystallized from ethanol to give arecoline hydrobromide having a melting point of 175° C.

The description which I have given above has described the process of my invention with reference to the dehydration of the methyl ester of N-methyl-4-hydroxypiperidine-3-carboxylic acid. My process, however, will give excellent results in the dehydration of other esters of 4-hydroxypiperidine-3-carboxylic acid compounds. It is particularly useful for the production of homo-arecoline from the ethyl ester of N-methyl-4-hydroxypiperidine-3-carboxylic acid. Homo-arecoline differs from arecoline only in that it has an ethyl ester group at the 3 position whereas arecoline has a methyl ester group at that position. Homo-arecoline may readily be converted to arecoline by hydrolysis of the ester group at the 3 position to produce arecaidine followed by esterification of the arecaidine with methyl alcohol to give arecoline.

For a fuller understanding of the nature and objects of the invention, reference may be had to the following examples which are given merely as further illustrations of the invention and are not to be construed in a limiting sense:

*Example I*

A solution of 17.3 gms. (0.1 mol) of 1-methyl-3-carbomethoxy-4-piperidinol in 25 cc. of xylene was added to 18 gms. of anhydrous oxalic acid suspended in 25 cc. of xylene and the mixture was heated to reflux with stirring. The hydroxypiperidine compound reacted with the oxalic acid to form an oily material which did not dissolve in the xylene but remained suspended therein. Dehydration took place at a steady rate with evolution of water which was collected in a conventional Dean-Stark type trap. The reaction was complete in about 3½ hours as shown by the amount of water collected. After cooling to about 100° C., the mixture was admixed with 50 cc. of water to dissolve the reaction product and the mixture was then cooled to room temperature. After separating the xylene layer from the mixture, the xylene was washed twice with 15 cc. portions of water and discarded. The combined aqueous extracts were then treated with sufficient potassium carbonate to neutralize the free oxalic acid and liberate the arecoline from its oxalic acid salt. About 37 gms. of potassium carbonate were used. The liberated arecoline was recovered from the aqueous mixture by extracting the mixture four times with 50 cc. portions of isopropyl acetate. After drying the combined isopropyl acetate extracts over sodium sulfate, the solvent was distilled off and then the product was distilled in vacuo. There was obtained 13.2 gms. of a light yellow liquid distilling at 88°–90° C. at 9 mm. (yield=85% of theory). The product consisted of a mixture of arecoline (1-methyl - 3 - carbomethoxy-$\Delta^{3,4}$-tetrahydropyridine), the $\Delta^{4,5}$ isomer thereof and unknown by-products, of which about 90% was the desired arecoline. The latter was readily isolated as the hydrobromide by treatment with three volumes of ethanolic HBr solution containing an equivalent weight of anhydrous hydrobromic acid. Arecoline hydrobromide separated from the ethanol solution as colorless needles on cooling the solution. A second crop was obtained on concentrating the filtrate and it was recrystallized from ethanol. A yield of 18.17 gms. or 77.3% of theory of arecoline hydrobromide having a melting point of 172°–174° C. was obtained.

Example II

The dehydration of 1-methyl-3-carbomethoxy-4-piperidinol was carried out in the absence of a solvent by admixing and heating 18 gms. of anhydrous oxalic acid with 17.3 gms. of the hydroxypiperidine compound. This mixture was heated to a temperature of 140° C. and maintained at that temperature for 3½ hours under atmospheric pressure. The desired arecoline was isolated from the reaction mixture in the same manner as in Example I except, of course, that the present example did not require separation of any solvent from the dehydration reaction mixture inasmuch as no solvent was employed in the dehydration step. A yield of arecoline hydrobromide of 14.05 gms. or 59.8% of the theoretical yield was obtained. The product had a melting point of 172°–174° C.

Example III

A very excellent yield (69%) of the desired arecoline (hydrobromide M. P. 172°–174° C.) was obtained from 1 - methyl - 3 - carbomethoxy - 4 - piperidinol by heating 17.3 gms. of the hydroxypiperidine compound with 18 gms. of oxalic acid at a temperature of 140° C. for 3½ hours under vacuum and recovering the product as in Example II.

Example IV

By dehydrating 1 - methyl - 3 - carbethoxy - 4 - piperidinol with oxalic acid in the same manner as 1-methyl-3-carbomethoxy-4-piperidinol was dehydrated in Example II, very excellent yields of homo-arecoline having a very high degree of purity are obtained.

Example V

Arecoline was prepared by heating a mixture of 17.3 gms. of 1 - methyl -3- carbomethoxy -4- piperidinol and 18 gms. of anhydrous oxalic acid at 155° C. in vacuo for 1½ hours. The arecoline, which was recovered from the reaction mixture as in Example II, gave a hydrobromide salt having a melting point of 173°–174° C.

Example VI

The acetate salt of 1-methyl-3-carbomethoxy-4-piperidinol prepared by admixing 6 cc. of acetic acid with 17 gms. of the piperidinol was admixed with 27 gms. of anhydrous oxalic acid and the resulting mixture heated for 4 hours at from 145° to 155° C. The arecoline which was produced was isolated as in the previous examples. Its hydrobromide salt melted at 172°–173° C.

Example VII

A dehydration reaction was carried out as in Example II except that the reaction mixture was heated for only 2½ hours instead of for 3½ hours as in Example II. Although the yield of arecoline was slightly lower than in Example II, the hydrobromide salt of the product had the same excellent melting point of 172°–174° C. as the hydrobromide of the product of Example II.

Example VIII

The hydrochloride salt of 1-methyl-3-carbomethoxy-4-piperidinol was dehydrated with anhydrous oxalic acid by heating two moles of the acid with one mole of the salt of the piperidinol for 3 hours at 140° C. The arecoline was recovered as in the previous examples.

It is evident from the above examples and detailed description that my process provides a far more efficient and satisfactory means for the dehydration of the esters of N-methyl-4-hydroxypiperidine-3-carboxylic acid than has previously been available.

Having described my invention what I claim as new and desire to secure by Letters Patent is:

1. A process for dehydrating an ester of N-methyl-4-hydroxy piperidine - 3 - carboxylic acid which comprises heating said ester with anhydrous oxalic acid at a temperature above 100° C.

2. A process for dehydrating an ester of N-methyl- 4 -hydroxypiperidine- 3 -carboxylic acid which comprises heating said ester with anhydrous oxalic acid at a temperature between about 100° C. and about 160° C.

3. A process for dehydrating the methyl ester of N-methyl -4- hydroxypiperidine -3- carboxylic acid which comprises heating said ester with anhydrous oxalic acid and a hydrocarbon solvent having a boiling point between about 100° C. and 160° C. said heating being carried out under reflux conditions.

4. A process for dehydrating the methyl ester of N-methyl -4- hydroxypiperidine -3- carboxylic acid which comprises heating said ester with anhydrous oxalic acid at a temperature of from about 130° C. to about 150° C.

5. A process for dehydrating the methyl ester of N-methyl -4- hydroxypiperidine -3- carboxylic acid which comprises heating said ester with anhydrous oxalic acid and a hydrocarbon solvent having a boiling point between about 130° C. and about 150° C. said heating being carried out under reflux conditions.

6. A process for dehydrating the methyl ester of N-methyl- 4 -hydroxypiperidine- 3 -carboxylic acid which comprises heating said ester with anhydrous oxalic acid at a temperature of about 140° C. for from about two and a half hours to about four hours.

7. A process for dehydrating the methyl ester of N-methyl -4- hydroxypiperidine -3- carboxylic acid which comprises heating a mixture of said ester, anhydrous oxalic acid and xylene under reflux conditions for from about two and a half to about four hours.

8. A process for dehydrating the methyl ester of N-methyl-4-hydroxypiperidine-3-carboxylic acid which comprises heating said ester with anhydrous oxalic acid at a temperature of about 140° C. for about three and a half hours.

9. A process for dehydrating the methyl ester of N-methyl-4-hydroxypiperidine-3-carboxylic acid which comprises heating a mixture of said ester, anhydrous oxalic acid and xylene at the reflux temperature of the xylene for about three and a half hours.

JOSEPH LEVY.

REFERENCES CITED

The following references are of record in the file of this patent:

UNITED STATES PATENTS

| Number | Name | Date |
|---|---|---|
| 2,451,738 | Isler | Oct. 19, 1948 |

FOREIGN PATENTS

| Number | Country | Date |
|---|---|---|
| 66,866 | Germany | 1891 |

OTHER REFERENCES

Dankova: Chem. Abstracts, 1943, p. 381.

Houben: Die Methoden der Organische Chemie Dritte Auflage (1943), p. 117.

Dorp: Rec. Trav. Chim., 1946, vol. 65, pp. 339–345.

Johnson: Acetylenic Compounds, pp. 51, 160–162 (1946).